(12) United States Patent
Barker

(10) Patent No.: US 9,482,149 B2
(45) Date of Patent: Nov. 1, 2016

(54) METHOD OF AND APPARATUS FOR OPERATING A SUPERCHARGER

(75) Inventor: Luke Barker, Maidford (GB)

(73) Assignees: NexxtDrive Limited, London (GB); Integral Powertrain Ltd, Bletchley (GB)

( * ) Notice: Subject to any disclaimer, the term of this patent is extended or adjusted under 35 U.S.C. 154(b) by 1343 days.

(21) Appl. No.: 12/934,244

(22) PCT Filed: Mar. 25, 2009

(86) PCT No.: PCT/GB2009/000783
§ 371 (c)(1),
(2), (4) Date: Oct. 18, 2010

(87) PCT Pub. No.: WO2009/118520
PCT Pub. Date: Oct. 1, 2009

(65) Prior Publication Data
US 2011/0270508 A1 Nov. 3, 2011

(30) Foreign Application Priority Data

Mar. 25, 2008 (GB) .................................. 0805400.9

(51) Int. Cl.
*F02B 33/44* (2006.01)
*F02B 39/06* (2006.01)
(Continued)

(52) U.S. Cl.
CPC .............. *F02B 39/06* (2013.01); *B60W 10/06* (2013.01); *B60W 10/08* (2013.01); *F02B 33/40* (2013.01);
(Continued)

(58) Field of Classification Search
CPC ........ F02B 39/10; F02B 33/32; F02B 37/10; F02B 39/04; F02D 41/0007; F02D 23/00; Y02T 10/144; F04D 25/024

USPC ................................ 60/607, 608; 123/559.1
See application file for complete search history.

(56) References Cited

U.S. PATENT DOCUMENTS

2003/0140630 A1* 7/2003 Baeuerle et al. ................ 60/612
2004/0237949 A1* 12/2004 Yasui et al. ................. 123/559.1
(Continued)

FOREIGN PATENT DOCUMENTS

JP          03-179141 A      8/1991
WO     WO2004/072449 A     8/2004
(Continued)

OTHER PUBLICATIONS

Patent Cooperation Treaty Application No. PCT/GB2009/000783: International Search Report and Written Opinion dated Jul. 9, 2009, 10 pages.

*Primary Examiner* — Thomas Denion
*Assistant Examiner* — Thomas Olszewski
(74) *Attorney, Agent, or Firm* — Baker & Hostetler LLP

(57) ABSTRACT

A method of and apparatus for operating a supercharger for an automotive engine is disclosed. The supercharger has: an input shaft for coupling to an engine crankshaft, and coupled to the rotor of a first electrical machine and a first component of an epicyclic gear train; and an output shaft connected to a compressor and a second component of the epicyclic gear train; wherein the third component of the epicyclic gear train is connected to the rotor of a second electrical machine. The first electrical machine is selectively operable to supply electrical energy to the second electrical machine. The method includes the steps of: (a) calculating a required speed of the second electrical machine that would give rise to a required pressure at an outlet of the compressor; and (b) setting the speed of the second electrical machine to the calculated required speed.

6 Claims, 2 Drawing Sheets

(51) Int. Cl.
*B60W 10/06* (2006.01)
*B60W 10/08* (2006.01)
*F02B 33/40* (2006.01)
*F02B 39/10* (2006.01)
*B60K 1/02* (2006.01)
*F02D 41/00* (2006.01)

(52) U.S. Cl.
CPC ............... *F02B 39/10* (2013.01); *B60K 1/02* (2013.01); *B60L 2240/421* (2013.01); *B60W 2550/12* (2013.01); *B60W 2710/081* (2013.01); *B60Y 2400/435* (2013.01); *F02D 41/0007* (2013.01); *Y02T 10/642* (2013.01)

(56) References Cited

U.S. PATENT DOCUMENTS

2006/0053788 A1   3/2006  Furman et al.
2010/0263638 A1*  10/2010  Kogo et al. ................... 123/562

FOREIGN PATENT DOCUMENTS

| WO | WO2006/134330 A | 12/2006 |
|----|-----------------|---------|
| WO | WO2008/020184 A | 2/2008  |

\* cited by examiner

METHOD OF AND APPARATUS FOR OPERATING A SUPERCHARGER

CROSS-REFERENCE TO RELATED APPLICATIONS

This application is the National Stage of International Application No. PCT/GB2009/000783, filed Mar. 25, 2009, which claims the benefit of Great Britain Patent Application No 0805400.9, filed Mar, 25, 2008, the disclosure of which is incorporated herein by reference in its entirety.

TECHNICAL FIELD

This invention relates to a method of and apparatus for operating a supercharger for use with an automotive engine. In particular, but not exclusively, this invention relates to a method of and apparatus for operating a supercharger of the type described in WO-A1-2004/072449.

BACKGROUND

WO-A1-2004/072449, the disclosure of which is incorporated herein by reference in its entirety, describes various forms of a supercharger for use with an automotive engine. These superchargers differ from a conventional supercharger in being operable to augment rotary power from the engine crankshaft with rotary power from one or more electric motors housed in a body of the supercharger.

For example, at least one of the superchargers described in WO-A1-2004/072449 includes an input shaft for coupling by a transmission belt to the crankshaft of the engine, and also includes an output shaft to which is fitted an air impellor. The supercharger further includes an epicyclic gear train, and first and second motor-generator electrical machines. The arrangement is such that the input shaft is coupled to the annulus of the epicyclic gear train and to the rotor of one of the electrical machines; the output shaft is coupled to the sun wheel of the epicyclic gear train; and the carrier of the epicyclic gear train is coupled to the other electrical machine.

This supercharger is advantageous in that it is operable to vary the pressure of air in the inlet manifold of the engine independently of the engine speed, and in an efficient and cost-effective manner. By varying the air pressure independently of engine speed, the supercharger can be very responsive to changes in load.

One known application of such superchargers is use together with one or more turbochargers to form a boosting system for an automobile engine. In one such known arrangement, the outlet of the compressor of the turbocharger is coupled to the inlet of the compressor of the supercharger; in other words, the turbocharger compressor is positioned upstream of, and in series with, the compressor of the supercharger.

This first arrangement is shown in FIG. 1 of the drawings. In another such known arrangement, the positions of the two are swapped: the turbocharger compressor is positioned downstream of, and again in series with, the compressor of the supercharger. This other arrangement is shown in FIG. 2 of the drawings.

These known arrangements increase the performance envelope and response rate of the resulting boosting system, thereby enabling higher engine output across a wider speed range and hence improved driving characteristics. In each of these arrangements, each turbocharger may be provided with one or more known means of controlling boost pressure, for example: exhaust wastegate, variable inlet guide vanes on turbine and/or variable turbine area.

In the first arrangement, in which the turbocharger is position upstream of the supercharger, it is typical to have a bypass around the supercharger compressor, that is from the inlet of the supercharger compressor (which essentially the same as the outlet of the turbocharger compressor), to the outlet of the turbocharger compressor. This is so that, at high airflow rates, all or part of the flow can avoid the supercharger compressor. This first arrangement is shown in FIG. 1 of the drawings.

In the second arrangement, in which the supercharger is positioned upstream of the turbocharger, it is also typical to have a bypass around the supercharger compressor, that is from the inlet of the supercharger compressor to the outlet of the supercharger compressor (which is the same as the inlet of the turbocharger compressor. Again, this is so that at high airflow rates all or part of the flow can avoid the supercharger compressor. This second arrangement is shown in FIG. 2 of the drawings.

With respect to FIG. 1, position 1 refers to a point or number of points upstream of the turbocharger compressor (s), position 2 refers to a point or number of points between the turbocharger compressor(s) and the supercharger compressor and position 3 refers to a point or number of points downstream of the supercharger compressor.

With respect to FIG. 2, position 1 is a point or number of points upstream of the supercharger compressor, position 2 is a point or number of points between the supercharger compressor and the turbocharger compressor(s) and position 3 is a point or number of points downstream of the turbocharger compressor(s).

Many turbocharged automotive engines have exhaust gas recirculation (EGR) systems which are commonly used to reduce NOx emissions or improve fuel consumption. These systems take exhaust gas from the exhaust system of an engine and feed it into the intake system of the engine. Various EGR systems are known. A first one of these is the so-called "low pressure" system where exhaust gas is taken from a point downstream of the turbocharger turbine (and usually after a particulate filter) and fed (usually through a cooler and a control valve) into the intake system upstream of the turbocharger compressor.

Another known EGR system is the so called "high pressure" system where exhaust gas is taken from a point upstream of the turbocharger turbine and fed (usually through a cooler and a control valve) into the intake system downstream of the turbocharger compressor.

The temperature of gas recirculated in this way, in other words the "EGR gas", can be controlled using a valve to selectively route part of the EGR gas through a cooler, with the remainder bypassing the cooler.

Furthermore, the temperature of the air-EGR charge mixture entering the engine can be controlled by using a valve to selectively route part of the air or air-EGR charge mixture through a charge cooler, with the remainder bypassing the cooler.

By using the arrangements illustrated in FIG. 1 and FIG. 2 and by controlling the balance of boosting work carried out by the turbocharger and the supercharger the capacity and range of the EGR system can be improved and fuel economy can be further optimized consistent with emissions requirements.

In particular the systems could deliver exhaust gas from upstream of the turbocharger turbine to position 1, 2 or 3. The systems could deliver exhaust gas from downstream of the turbocharger turbine to position 1. System 1a could deliver exhaust gas from downstream of the turbocharger turbine to position 2.

By using the supercharger in combination with a turbocharger and with a suitable control system it is also possible to arrange for the pressure at position 3 to be higher than the pressure upstream of the turbocharger turbine. In combination with suitable valve event timing this can be used to scavenge the cylinder of hot exhaust gas thus reducing combustion temperature and NOx emissions. Furthermore this scavenging effect can be used to improve volumetric efficiency and hence performance.

The forgoing is provided in order to assist the addressee in understanding possible applications of the superchargers described in WO-A1-2004/072449. However, it is envisaged that such superchargers may also be used singly, that is without a turbocharger, to boost the inlet pressure to an automotive engine.

It will be understood by the skilled addressee that many engine management systems for automotive engines that are arranged to operate with a supercharger and/or a turbocharger, rely on being able to control the pressure of the charge at the inlet to the engine to correspond to a predetermined required pressure for current, or desired, operating conditions. A range of such predetermined required engine inlet pressures may, for example, be stored in a look-up table to which the engine management system has access. Controlling the engine inlet pressure is very important for correct and efficient operation of the engine. In the arrangements shown in Figure X and Figure Y, this engine inlet pressure corresponds to the pressure at position 3; in the arrangement referred to above in which such a supercharger is used on its own, without a turbocharger in series therewith, this pressure corresponds to the pressure at the outlet of the supercharger compressor.

However, the rate at which the supercharger can respond to demand and add boost pressure to the intake system is relatively fast and is typically an order of magnitude faster than the rate at which a turbocharger can respond. This means that control of the supercharger based on actual versus target boost pressure is likely to result in instability and overshooting, and/or to unfavourable interaction with a turbocharger controller in the event that the supercharger is used with a turbocharger.

Embodiments of the present invention are directed towards providing control of the outlet pressure of a supercharger of the type described hereinabove in order to address this problem.

SUMMARY

According to a first aspect of this invention, there is provided a method of operating a supercharger for an automotive engine, the supercharger having: an input shaft for coupling to an engine crankshaft, and coupled to the rotor of a first electrical machine and a first component of an epicyclic gear train; and an output shaft connected to a compressor and a second component of the epicyclic gear train; wherein the third component of the epicyclic gear train is connected to the rotor of a second electrical machine, wherein the first electrical machine is selectively operable to supply electrical energy to the second electrical machine and wherein the method includes the steps of:

a) calculating a required speed of the second electrical machine that would give rise to a required pressure at an outlet of the compressor; and b) setting the speed of the second electrical machine to the calculated required speed.

Whilst it might be thought that the best way of achieving the required engine inlet pressure would be by monitoring actual pressure at the engine inlet and controlling the supercharger so that this approaches the required inlet pressure by closed-loop feedback control, such an approach would have drawbacks. As mentioned hereinabove, the rate at which the supercharger can respond to demand and add boost pressure to the intake system is relatively fast and is typically an order of magnitude faster than the rate at which a turbocharger can respond. This means that control of the supercharger based on actual versus target boost pressure is likely to in instability and overshooting, and/or to unfavourable interaction with a turbocharger controller in the event that the supercharger is used with a turbocharger.

By contrast, accurate control of the speed of the second electrical machine, whilst not at first sight the most apparently attractive solution, can be readily achieved using known electric motor control systems to achieve stable control of engine inlet pressure. This has been verified by simulation and experimental results. Step (a) may include sensing the compressor shaft speed, and sensing temperature and pressure at an inlet to the supercharger.

Where the method is used to operate a supercharger in an arrangement such as that shown in FIG. 1 or FIG. 2, the pressure at position 3 may be substituted for the "required pressure at an outlet of the compressor" in step (a) above.

According to another aspect of this invention there is provided a control system for a supercharger as defined in the first aspect of this invention, the control means arranged and operable to carry out the steps of the method of the first aspect.

The control means may include processing means operable to carry out the steps. The processing means may have access to storage means, such as a record carrier, in which is stored a record indicative of the steps. The processing means may be a processor of an electronic control unit of an engine management system.

The control means may include sensing means necessary to sense the or each value necessary to carry out the method. The skilled addressee with be familiar with forms of sensing means that would be suitable for such purposes and how these might be arranged such that the processing means may receive inputs therefrom.

According to a further aspect of this invention, there is provided a record carrier having recorded thereon or therein a record of computer-readable instructions executable by the processing means to cause the control system to carry out the steps of the method. The record carrier may be non-volatile memory, and may be solid state memory; it may be a computer-readable disk; it may be a wireless signal.

SPECIFIC DESCRIPTION OF CERTAIN EXEMPLARY EMBODIMENTS

Specific examples in which the present invention is embodied will now be described in detail. The skilled addressee will understand that information contained hereinabove may be used in combination with that which follows in order to understand embodiments of the invention.

Embodiments of the present invention may be used to operate a supercharger of the type described hereinabove and in WO-A1-2004/072449. In certain embodiments, the supercharger may be operated without an accompanying turbocharger in series with it. In other embodiments, the supercharger may be employed in an arrangement such as that shown in FIG. 1 and FIG. 2.

Figure 1:
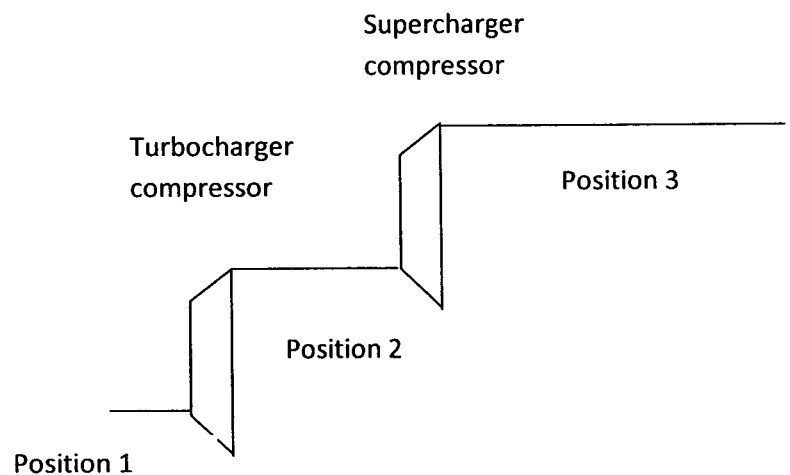
FIG. 1 shows a first arrangement of a supercharger and a turbocharger.
Figure 2:
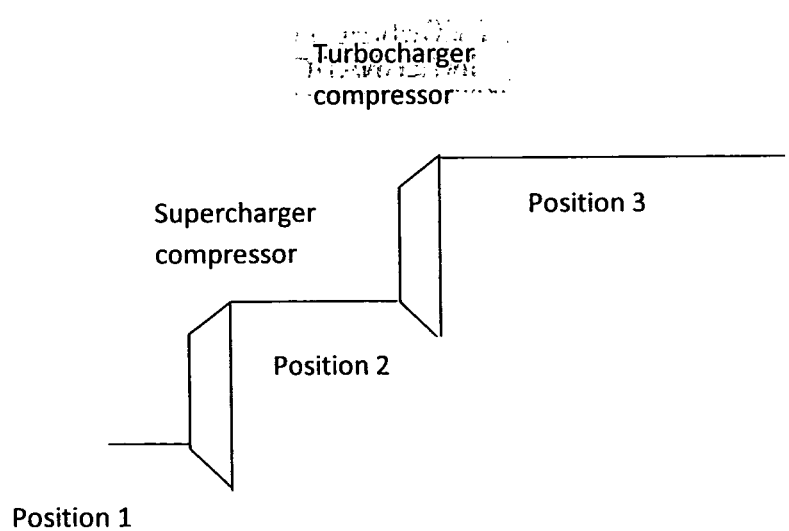
FIG. 2 shows a second arrangement of a supercharger and a turbocharger.
Figure 3:
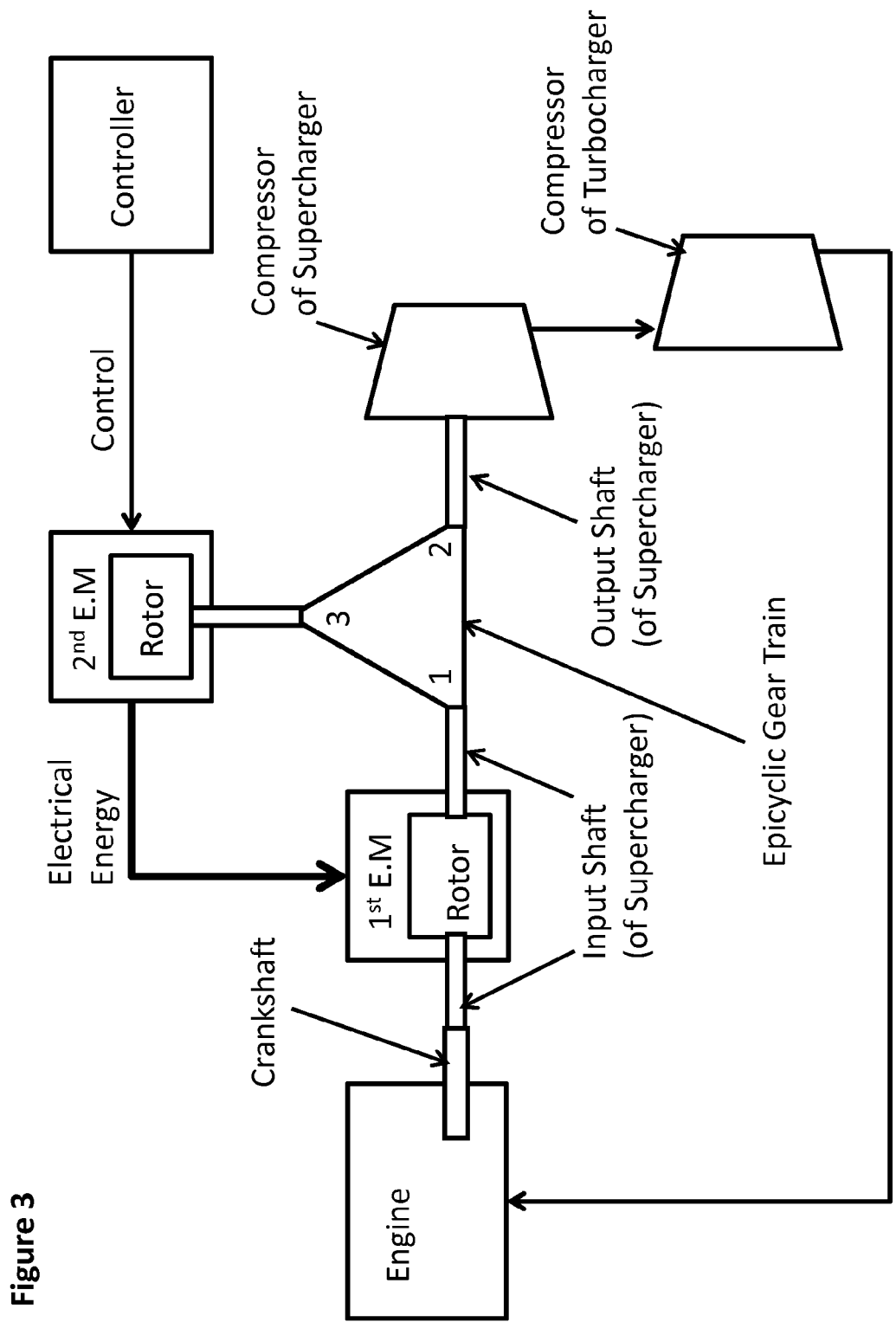
FIG. 3 shows an embodiment of a system in which a supercharger is connected in series upstream of a turbocharger, in accordance with an embodiment of the present invention. A controller is used to calculate a required speed of a second electrical machine using a model-based approach for controlling a target pressure downstream of a compressor of the turbocharger that would give rise to a required pressure at an outlet of the compressor downstream of the supercharger and the turbocharger. The controller is used to set the speed of the second electrical machine to the calculated required speed.

The following is a description of operation of the supercharger in an arrangement such as that shown in FIG. 1 and FIG. 2.

The way the proposed method controls the supercharger can be split into three steps.

Firstly, the required pressure at point 3 (hereinafter "P3") is determined from a number of inputs and a first control algorithm. Existing engine management systems for automotive engines often already have a means of determining this pressure. Look-up tables, for example, are often used. This pressure will be referred to as the "target" P3 in this specific description.

Secondly, the target P3 is combined with a number of other inputs and a second control algorithm to produce a target speed for the second electrical machine.

In the third step, a speed controller (which may be of a known type) is used to achieve the target speed.

In the case of the configuration illustrated in FIG. 1, the control of the turbocharger(s) can be by known means based on achieving a target pressure P2.

In the case of the configuration illustrated in FIG. 2, the control of the turbocharger(s) can be based on conventional means to achieve a target pressure difference or ratio (P3–P2 or P3/P2).

Alternatively the turbocharger(s) in either configuration can be controlled by known means based on achieving a target speed.

The first control algorithm may include all or some of the following inputs. Some of these inputs may be measured and others may be inferred from the measured inputs as is common practice in engine control systems.

Inputs for first control algorithm may include one, more or all of:
 Pressure at position 1
 Pressure at position 2
 Temperature at position 1
 Temperature at position 2
 Torque demand
 Driver demand
 Engine speed
 Turbocharger speed
 EGR demand
 Valve timing (for variable valve timing system)

In a preferred embodiment, a key output is target pressure at position 3. In an alternative embodiment, a target airflow may be employed in combination with engine mapping data.

The second algorithm may include all or some of the following inputs Some of these inputs may be measured and others may be inferred from the measured inputs as is common practice in engine control systems.

Inputs for second control algorithm may include one, more or all of:
 Target pressure at position 3 (preferred) or target airflow
 Engine speed
 Supercharger input shaft speed
 Pressure at supercharger compressor inlet
 Temperature at supercharger compressor inlet
 Airflow at supercharger compressor inlet
 EGR demand For example, from sensing the supercharger input shaft speed, and from the fundamental equation that governs epicyclic gear trains, together with a knowledge of the ratios of the epicyclic gear train, it is possible to arrive at an equation in terms of the speed of the second electrical machine and the compressor shaft speed. Furthermore, normal turbocharger mapping allows the compressor shaft speed to be derived as a function of the pressure and temperature at the supercharger compressor input, the airflow at that input, and the target P3. These two equations can be solved simultaneously to give the target speed of the second electrical machine.

This algorithm may make use of a measured or inferred value of P3 (preferred) or airflow in order to close the loop and eliminate errors due to inputs, hardware variations or algorithm inaccuracy, thus assuring P3 or airflow stabilises at the required value prescribed by the first algorithm. This correction may be achieved through an integral controller.

As mentioned above, a known speed controller may then be used to operate the second electrical machine at the target speed.

By using a model-based approach for controlling P3, rather than direct-control based on sensing P3 and providing closed-loop feedback control, a much more stable form of control of the supercharger, and hence of the engine, results.

It is noted that a simplified version of algorithms 1 and 2 can be used to control the supercharger on its own (i.e. without a turbocharger). In this case the arrangement is like that of FIG. 1, except the compressor has no effect and positions 1 and 2 are the same.

Having described the operation of the system, the skilled addressee will be familiar with the components necessary for, and appreciate how, the system can be put into practice. For example, the skilled person will understand how, and by what means, the inputs to the algorithms described above can be sensed and how, and by what means, these can be operated upon.

It is envisaged that the method be embodied in computer-readable code stored in non-volatile memory which can be accessed by an engine management system of an automobile in which the supercharger is fitted. For example, the method may be stored as coded instructions in memory of processing means of an electronic control unit (ECU).

The invention claimed is:

1. A method of operating a supercharger for an automotive engine, the supercharger having: an input shaft for coupling to an engine crankshaft, and being coupled to a rotor of a first electrical machine and a first component of an epicyclic gear train; and an output shaft connected to a compressor and a second component of the epicyclic gear train; wherein a third component of the epicyclic gear train is connected to a rotor of a second electrical machine, wherein the first electrical machine is selectively operable to supply electrical energy to the second electrical machine, wherein the supercharger is provided upstream in series with a turbocharger, and wherein the method includes the steps of:

a) calculating, using a controller, a required rotor speed of the second electrical machine using a model-based approach for controlling a target pressure downstream of a compressor of the turbocharger that would give rise to a required pressure at an outlet downstream of the supercharger and the turbocharger; and b) setting, using the controller, the rotor speed of the second electrical machine to the calculated required speed.

2. A method according to claim 1, wherein step (a) includes sensing the supercharger input shaft speed, and sensing a pressure and temperature at an inlet of a compressor of the supercharger, or the airflow at that inlet.

3. A method according to claim 2, wherein step (a) further includes calculating the required speed of the electrical machine from at least these sensed values, from a characteristic ratio of the epicyclic gear train, and from the required pressure at the outlet of the compressor.

4. An apparatus for operating a supercharger for an automotive engine, the supercharger having an input shaft for coupling to an engine crankshaft, and being coupled to a rotor of a first electrical machine and a first component of an epicyclic gear train, and an output shaft connected to a compressor and a second component of the epicyclic gear train, wherein a third component of the epicyclic gear train is connected to a rotor of a second electrical machine, wherein the first electrical machine is selectively operable to supply electrical energy to the second electrical machine, wherein the supercharger is provided upstream in series with a turbocharger, said apparatus comprising:

a control system configured to calculate a required rotor speed of the second electrical machine using a model-based approach for controlling a target pressure downstream of a compressor of the turbocharger that would give ride to a required pressure at an outlet downstream of the supercharger and the turbocharger, and to set the rotor speed of the second electrical machine to the calculated required speed.

5. The apparatus according to claim 4 and including processing means operable to execute computer-readable instructions such that the apparatus carries out the steps of: sensing the supercharger input shaft speed, the pressure and temperature at the supercharger compressor inlet, and the airflow at that inlet; and calculating the required rotor speed of the second electrical machine from at least these sensed values, from a characteristic ratio of the epicyclic gear train, and from the required pressure at the outlet of the compressor.

6. A non-transitory computer readable medium with computer-readable instructions stored thereon executable by a processing means to cause a control system of an apparatus for operating a supercharger, wherein the supercharger is provided upstream in series with a turbocharger, to carry out the steps of: sensing supercharger input shaft speed, pressure and temperature at a supercharger compressor inlet, and airflow at that inlet; and calculating, using the control system, a required rotor speed of an electrical machine from at least these sensed values using a model-based approach for controlling a target pressure downstream of a compressor of the turbocharger, from a characteristic ratio of an epicyclic gear train, and from a required pressure at an outlet downstream of the supercharger and the turbocharger.

* * * * *